United States Patent
Baratharajan et al.

(10) Patent No.: US 9,207,884 B1
(45) Date of Patent: Dec. 8, 2015

(54) METHODS AND SYSTEMS FOR DISPATCH OF DOCUMENTS

(71) Applicant: XEROX CORPORATION, Norwalk, CT (US)

(72) Inventors: Jineshwari Baratharajan, Chennai (IN); Bhanu Kishore Yakkala, Hyderabad (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/597,284

(22) Filed: Jan. 15, 2015

(51) Int. Cl.
G06F 3/12 (2006.01)
H04N 1/00 (2006.01)
H04N 1/32 (2006.01)
G06K 15/02 (2006.01)

(52) U.S. Cl.
CPC ............ *G06F 3/1204* (2013.01); *G06F 3/1286* (2013.01); *G06F 3/1294* (2013.01); *H04N 1/00204* (2013.01); *H04N 1/00408* (2013.01); *H04N 1/32085* (2013.01); *H04N 1/32117* (2013.01); *H04N 1/32566* (2013.01); *H04N 2201/0072* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,375,835 B1* | 5/2008 | Hull et al. | 358/1.15 |
| 8,098,392 B2* | 1/2012 | Yamaguchi | H04N 1/00405 358/1.15 |
| 2006/0139685 A1* | 6/2006 | Hayashi | 358/1.15 |
| 2007/0036558 A1* | 2/2007 | Huss et al. | 399/8 |
| 2007/0211279 A1* | 9/2007 | Podl et al. | 358/1.15 |
| 2008/0170256 A1* | 7/2008 | Matsuhara et al. | 358/1.15 |
| 2009/0257081 A1* | 10/2009 | Bouchard | G06Q 10/10 358/1.15 |
| 2011/0205578 A1* | 8/2011 | Gouda | 358/1.15 |
| 2011/0216349 A1* | 9/2011 | McCorkindale et al. | 358/1.15 |
| 2014/0211246 A1* | 7/2014 | Okuno | 358/1.15 |
| 2015/0062636 A1* | 3/2015 | Kanbayashi | G06F 3/1203 358/1.15 |

FOREIGN PATENT DOCUMENTS

| JP | 2003-150359 | * | 5/2003 | G06F 3/12 |
|---|---|---|---|---|
| JP | 2008-186193 | * | 8/2008 | G06F 3/12 |

* cited by examiner

*Primary Examiner* — Beniyam Menberu

(57) ABSTRACT

Methods and systems facilitating a first user to receive printed documents via a second user are provided. A method at a digital printer includes registering second users with the printer based on a list of the second users and identity information. The disclosure detects one or more of the second users present in proximity of the printer. When a job request along with a selection of a dispatch mode is received from the first user, the printer detects the second users based on the identity information. The disclosure further includes sending a first message to one or more second computing devices of the second users for requesting to collect documents on behalf of the first user. Upon executing the request, at least one second user collects the documents from the printer. After collection of the documents, the printer can send a second message informing the first user about document collection.

22 Claims, 6 Drawing Sheets

METHODS AND SYSTEMS FOR DISPATCH OF DOCUMENTS

TECHNICAL FIELD

The presently disclosed embodiments relate to multi-function electronic devices such as a printer, and more particularly to systems and methods for facilitating users to receive printed document(s) via other user(s) from a digital printer.

BACKGROUND

A computer network for a group of users is typically installed such that each end user can access the network from a desktop or portable computer from the user's desk or workplace area. However, printers for the network are typically installed in central locations and shared among a group of users. A printer can be installed in a particular location, and a user may be in a different room, a different floor, or even a different building to that of the printer. Users can take printout of a document from anywhere if they are connected to the same network as that of the printer. However, sometimes the user has to walk a certain amount of distance just to collect a printed document. At times the user may not be able to collect the printed document because of the time constraint or location of the printer.

SUMMARY

An embodiment of the present disclosure provides a method for facilitating a first user to receive at least one printed document via at least one of a number of second users. The method for digital printer includes registering, by a user registration device of the digital printer; the second users with the digital printer based on a list of the second users and associated identity information of the second users. The identity information of the second users is provided by the first user. The method also includes detecting, by a detection device of the digital printer, one or more second users present within a pre-defined range of distance from the digital printer when a job request along with a selection of a dispatch mode is received from the first user. The one or more second users are detected based on the identity information stored in a database. The dispatch mode selection informs the digital printer to detect the one or more second users for dispatch of the documents of the first user. The method also includes sending, by a transceiving device of the digital printer, a first message to one or more second computing devices associated with the detected one or more second users for requesting the one or more second users to collect one or more documents on behalf of the first user from the digital printer. The method further includes executing, by a job execution device of the digital printer, the received job request. At least one second user collects the one or more documents from the digital printer based on the execution of the job request. The method furthermore includes sending, by the transceiving device, a second message to the first user. The second message informs the first user that the one or more documents have been collected by the at least one second user.

Another embodiment of the present disclosure provides a system for facilitating a first user to receive at least one printed document via at least one of a number of second users. The system at a digital printer includes a user registration device for registering the second users with the digital printer based on a list of the second users and associated identity information of the second users. The identity information is provided by the first user. The system also includes a detection device for detecting one or more of the second users present within a pre-defined range of distance from the digital printer when a job request along with a selection of a dispatch mode is received from the first user. The one or more second users are detected based on the identity information stored in a database. The dispatch mode selection informs the digital printer to detect the one or more second users for dispatch of the documents of the first user. The system also includes a transceiving device for receiving one or more job requests from a first computing device associated with the first user. The transceiving device is also configured to send a first message to one or more second computing devices associated with the one or more second user collects the one or more documents from the digital printer based on the execution of the job request. The transceiving device sends a first message to one or more second computing devices associated with the one or more second users for requesting the one or more second users to collect one or more documents of the first user from the digital printer. The system further includes a job execution device for executing the received job request. At least one second user collects the documents from the digital printer based on the execution of the job request. The transceiving device sends a second message to the first user. The second message informs the first user that the documents have been collected by the at least one second user.

Yet another embodiment of the present disclosure provides a method for facilitating a first user to receive at least one printed document via at least one of a plurality of second users. The method at a Multi-Function Device (MFD) includes registering, by a user registration device of the MFD, the plurality of second users with the MFD based on a list of the plurality of second users and associated identity information of the plurality of second users, wherein the identity information is provided by the first user. The method also includes detecting, by a detection device of the MFD, one or more second users of the plurality of second users present within a pre-defined range of distance from the MFD when a job request along with a selection of a dispatch mode is received from the first user, wherein the one or more second users are detected based on the identity information stored in a database, wherein the dispatch mode selection informs the MFD to detect the one or more second users for dispatch of the documents of the first user. The method further includes sending, by a transceiving device of the MFD, a first message to one or more second computing devices associated with the detected one or more second users for requesting the one or more second users to collect one or more documents on behalf of the first user from the MFD. The method also includes executing, by a job execution device of the MFD, the received job request, wherein at least one second user collects the one or more documents from the MFD based on the execution of the job request. The method furthermore includes sending, by the transceiving device, a second message to the first user, wherein the second message informs the first user that the one or more documents have been collected by the at least one second user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
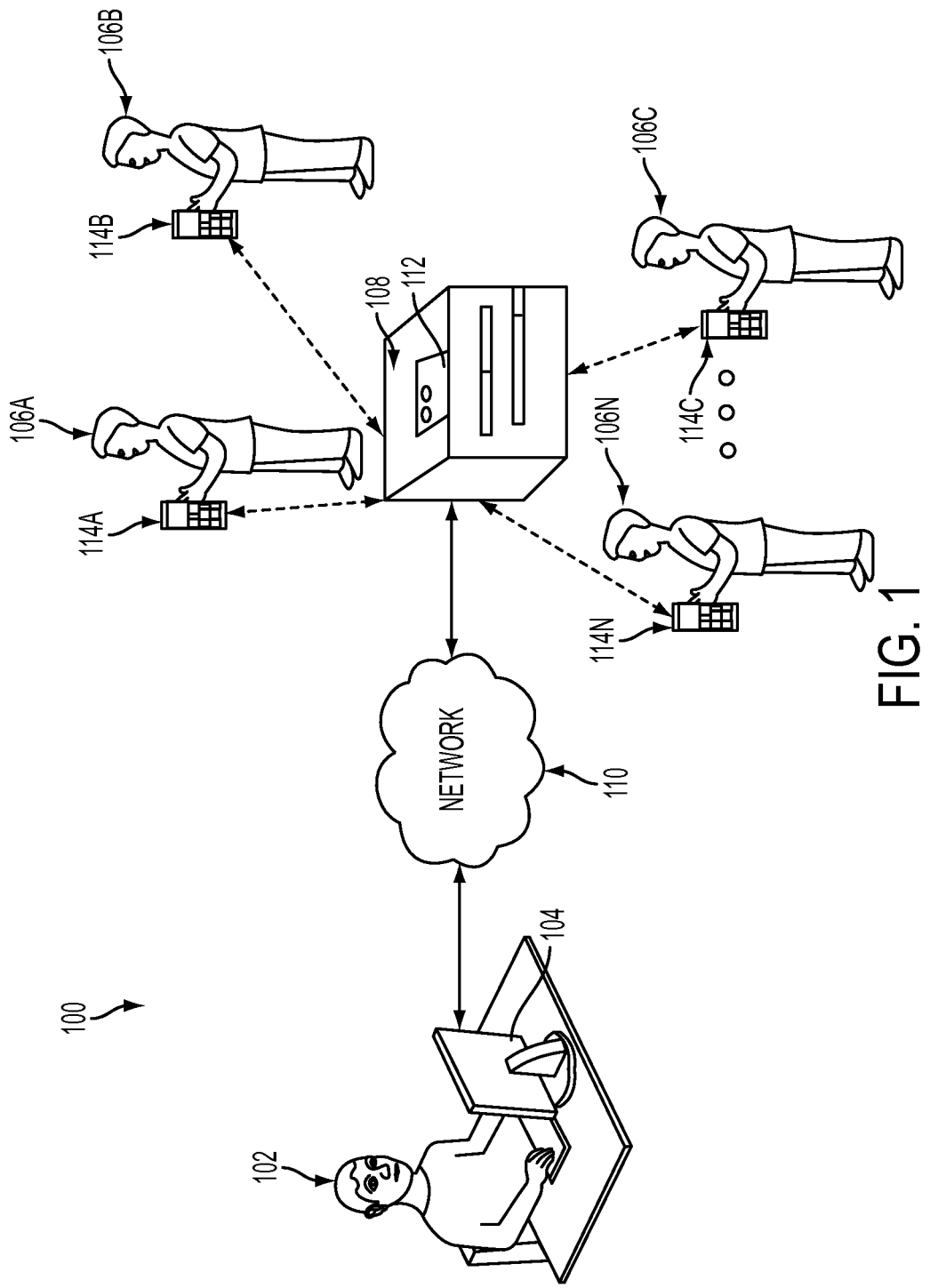
FIG. 1 is a schematic diagram illustrating an exemplary system including Multi-Function Device, in accordance with an embodiment of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

NON-LIMITING DEFINITIONS

In various embodiments of the present disclosure, definitions of one or more terms that will be used in the document are provided below.

As used herein, a Multi-Function Device (MFD) as used herein includes a single device that offers a number of traditionally separate functionalities, such as printing, copying, scanning, and faxing. The functionalities mainly include digital printing, where printed sheets or documents are output in response to electronic signals (the signal may or may not include the image data itself).

Further, a "mobile device" refers to any device that has a wireless connection with a network or components related to the network. The "mobile device" can also be a landline telephone as long as it can communicate with the MFD remotely. The present disclosure includes mobile consumers using mobile devices, such as cell phones, Smartphones, PDAs, tablet computers, and so on.

Moreover, an "address" is any identifying information that allows a device to be accessed on a network, such as an IP address or URL, the URL including both long form (including full protocol information, such as "http://") or short form, beginning with "www" or only a website name, such as "foobar.com". An "access code" is an identifier capable of designating a specific device, such as an MFD, on a computer network or local computer system.

A Media Access Control" (MAC) address is a unique identifier that may be assigned to network devices, network interfaces, etc. for communication in the network. The MAC address is used as a network address for most of IEEE 802 network technologies.

A "Radio Frequency Identification tag" or an "RFID tag" is a unique identifier that can be assigned to objects that need to be identified. RFID uses electromagnetic fields to wirelessly transfer data, for the purposes of automatically identifying and tracking the RFID tags attached to objects.

A "telephone number" is an identifier capable of identifying a device or location on a telephone network of any type, including traditional voice networks, packet-oriented switching, etc.

As used herein, a "Graphical User Interface" (GUI) can include an interface on the device enabling a user to interact with the device or MFD. The GUI may include one or more graphical format objects.

The device or system for facilitating a first user to receive at least one printed document via at least one of a plurality of second users may be a software, hardware, firmware, or combination of these. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Overview:

The present disclosure provides methods and systems facilitating a user, such as a first user, to get his/her printed documents from a Multi-Function Device (MFD), such as a digital printer, to his/her desk instead of going to and collecting them from the digital printer. The first user can define or register a number of second users at the MFD by providing the identity information of the second users or the associated second computing devices. The user can provide the ID information, such as name of the second user, Media Access Control (MAC) address or ID of the computing device, Radio Frequency Identification (RFID), Bluetooth identity, etc., at the MFD manually beforehand. The first user may register the second users at the time of machine configuration or at a later time. The first user may require registering the list of second users with the MFD before giving a job request at the MFD. When the MFD receives a job request along with a dispatch mode selection from a first computing device of the first user. The digital printer device may execute the job request and the output of the execution of the job request may be one or more documents. Further, the MFD may detect one or more second users who are within a pre-defined range of distance from the MFD. If there are any registered second users detected within a pre-defined range of distance from the MUG, then the MFD sends a message to the detected second user asking him/her to collect the documents generated as the job request executed on the MFD. In some embodiments, the job request may be executed when one of the detected second users presses or selects a "Yes" option on the MFD. The second user then may collect the documents and hand them over to the first user. The MFD can inform the first user by sending another message that the second user has collected the documents.

Exemplary Embodiments

FIG. 1 is a schematic illustrating an exemplary environment 100 where various embodiments of the present disclosure may function. The environment 100 primarily includes a first user 102 having an associated first computing device 104, a number of second users 106A-106N, and a Multi-Function Device (MFD) 108. The MFD 108 in turn may include one or more devices or modules, which may be hardware, software or combination of these, as described in detail with reference to FIG. 2. Further, the first user 102 may interact with the MFD 108 via a network 110. The network 110 can be a wireless network, wired network or combination of both. Each of the second users 106A-106N also has associated second computing devices 114A-114N, respectively. Examples of the first computing device 104 and the second computing devices 114A-114N may include, but are not limited to, a mobile phone, a desktop computer, a laptop, a tablet computer, a smart phone, a PDA, and so forth.

The first user 102 can register the second users 106A-106N and/or their associated second computing devices 114A-114N with the MFD 108 by configuring one or more devices or modules of the MFD 108. Further, the first computing device 104 may provide identity information of the second users 106A-106N and/or their associated second computing devices 114A-114N for registration. Hereinafter, the second users 106A-106N may be collectively referred to as second users 106 and second computing devices 114A-114N may be collectively referred to as second devices 114. Examples of the identity information may include, but are not limited to, a name, a user identity, an RFID tag, a MAC ID, a Bluetooth ID, and so forth.

In some embodiments, the first user 102 provides the identity information at the MFD 108 at the time of configuration of the MFD 108, for example when the MFD 108 is first installed on network 110. In alternative embodiments, the first computing device 104 registers the second users 106 with the MFD 108 prior to sending or executing a job request to the MFD 108. The MFD 108 can store and maintain the identity information.

In an exemplary scenario, the MFD 108 can be a printing device, and the job request may be a print job request for printing one or more documents or sheets onto a media such as a paper, etc., based on one or more electronic signals. The MFD 108 can receive one or more job requests from the first computing device 104. The first user 102 can submit a job request from the first computing device 104 and desire for one of the second users 106A-106N to retrieve or collect the printed documents. The first user 102 may select a dispatch mode and send the dispatch mode selection along with the job request to the MFD 108. The MFD 108 may receive the dispatch mode selection along with the job request and begin to detect the one or more of the second computing devices 114A-114N. The dispatch mode selection can inform the MFD 108 to detect the one or more second users 106A-106N (and/or their associated second computing devices 114A-114N) for dispatch of the documents of the first user 102. When the dispatch mode selection is received, the MFD 108 may detect the one or more of the second users 106A-106N that may be present in a pre-defined range of distance from the MFD 108. In some embodiments, the pre-defined range of distance could be a structurally defined area, an area defined by limitations of wireless radio transmissions of the MFD 108, or an area defined by physical proximity to the MFD 108. For example, a pre-defined range of distance could be an area within the same floor of a building of the MFD 108. In another example, the pre-defined range of distance could be within an area of 10 meters, in proximity to the MFD 108. The embodiments are intended to include or otherwise cover any pre-defined range of distance (or area) that can function for the intended embodiments of the MFD 108. The second users 106 are detected based on the identity information stored in the MFD 108.

The embodiments are intended to include an apparatus and method for the MFD 108 to detect the user 102 or second users 106 registered with the MFD 108. Various techniques for detection of the second computing devices 114 can include, but are not limited to, Wi-Fi detection, Bluetooth detection, and Near Field Communication (NFC). In other embodiments, the MFD 108 may detect the second computing devices 114 based on an infrared (IR) sensing, an RFI detection, a motion detection, and so forth.

The MFD 108 may include a network adaptor and/or antenna for sensing and detecting second computing devices 114 or first computing device 104. In some embodiments, a detection device of MFD 108 detects and collects identity information of the second computing devices 114 such as MAC addresses. A network device such as a network adaptor has a unique MAC address. If the particular feature, i.e., Wi-Fi, Bluetooth, or NFC is activated on the second computing device 114, then the corresponding network adapter for the second computing device 114 can continue broadcasting the MAC address second computing device 114 at regular intervals for detection by MFD 108. The NFC is a very short range communication, for example, only for few centimeters; hence the second user 106 has to be close in close proximity to the MFD 108 to detect the second computing device 114 of the second users 106. In contrast, Bluetooth and Wi-Fi devices may transmit for longer ranges. The antenna used in the MFD 108 may be selected based on the detection range that the MFD 108 should be able to recognize. For example, if the MFD 108 needs to recognize only users in a close proximity to the MFD 108, then a Wi-Fi receiver may receive only high strength signals. The range of the wireless communication for the MFD 108 can be set by an Equation 1 also known as the Friis transmission equation. Given two antennas (one at the MFD 108 and one at the computing device), the ratio of power available at the input of the receiving antenna, Pr, to output power to the transmitting antenna, Pt, is given by $$Pr/Pt = (Gt*Gr/Ft)*(\lambda/4*\pi*R)^2$$ Equation 1:

The variable R is the range of the transmission, Gt and Gr are antenna gains (with respect to an isotropic radiator), λ is the wavelength, Ft is a loss factor that can be chosen appropriately to decide the range of the transmission, Pr is the available power at the receive antenna, and Pt is the power delivered to the transmit antenna. Gt is the transmit antenna gain and Gr is the receive antenna gain. Pt and Gt belongs to the second computing device 114 (or the first computing device 104) and therefore are constant. A desired range of transmission can be achieved by choosing an antenna in the MFD 108 (receiver) with appropriate receive antenna sensitivity, i.e., Pr, Gr, the loss factor (shield to the receiver or receive antenna).

The MAC address second computing devices 114 can be captured or detected by the detection device 206. The MFD 108 can be configured to match the captured identity information, such as the MAC addresses of the detected second computing devices 114 of the second users 106, are matched with stored identity information present at the MFD 108. If the identity information, i.e., the MAC address, of the one or more second computing devices 114 matches with one of the stored identity information of the second users 106 second computing devices 114. The MFD 108 may execute the job request either as soon the job request is received or may wait for selection of one of the options on a display 112 by the second users 106 or the first user 102. The MFD 108 also includes a display or Graphical User Interface (GUI) 112 for displaying one or more options to the users (first user 102 or the second users 106). Hereinafter, the terms display 112 and GUI 112 are used interchangeably without a change in meanings.

The MFD 108 can send a first message to the second computing devices 114 of the second users 106 based on the matching of the identity information. Hereinafter, the terms second computing devices 114 and the second computing devices 114 may be used interchangeably without changing the meaning. The MFD 108 can send a first message to the detected one or more second computing devices 114 of the detected second users 106 for requesting the one or more second users 106 to collect one or more documents on behalf of the first user 102 from the MFD 108. The job request may be executed by the MFD 108.

Any one of the one or more second users 106 in proximity to the MFD 108 and can select a "Yes option" and can retrieve/collect the printed documents from the MFD 108. As soon the one of the second users 106 selects the "Yes option," a second message is sent to the first user 102 informing him/her that the documents have been retrieved by the second user 106. In some embodiments, the second message can be sent to the first user 102 when the second user 106 retrieves the documents from the MFD 108. Further, the second message may include details such as a name, user ID, etc., of the second user 106 who has retrieved the documents on behalf of the first user 102. The first message or the second message can include an SMS, an MMS, an email, a voice message, an audible message, and a combination of these.

Figure 2:
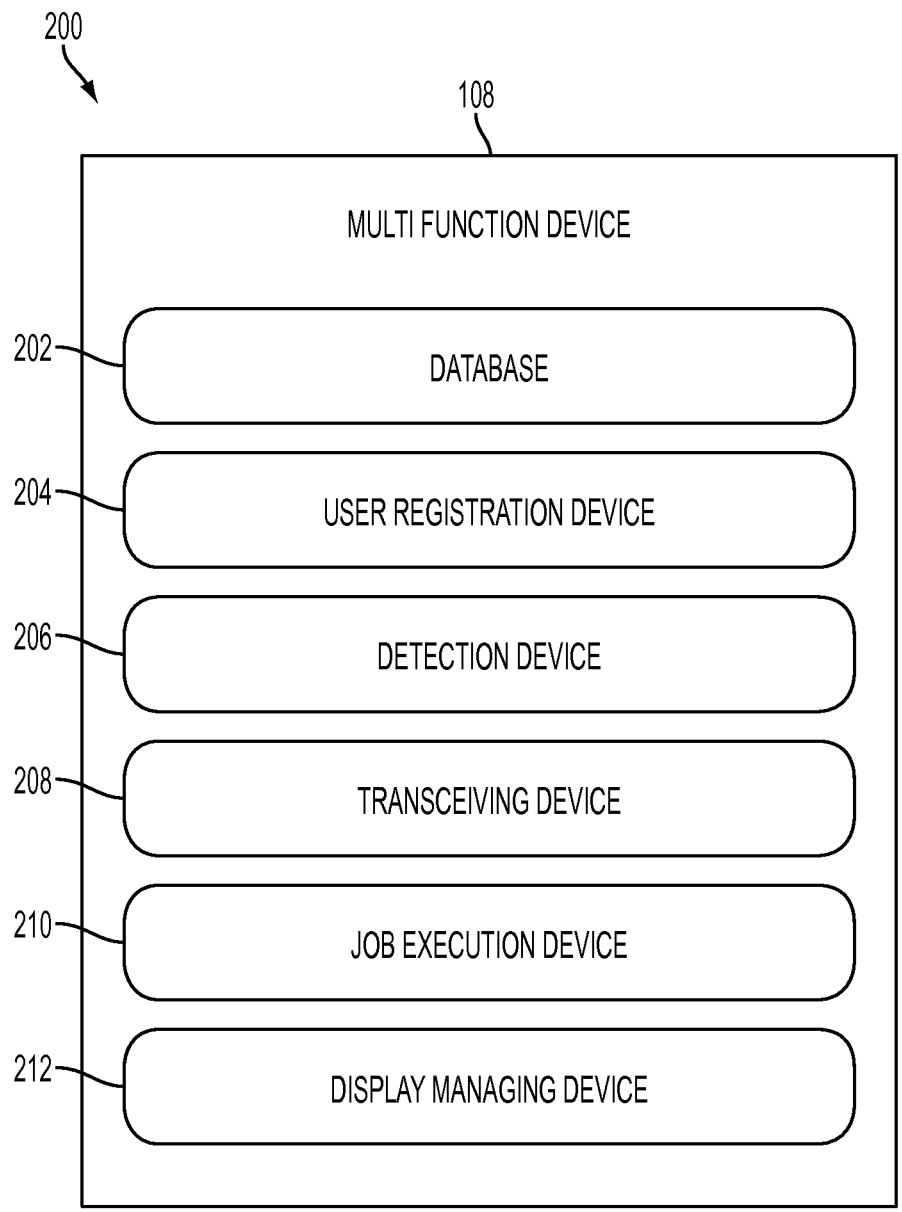
FIG. 2 is a block diagram illustrating various system elements of Multi-Function Device (MFD) of FIG. 1, in accordance with an embodiment of the present disclosure.

FIG. 2 is a block diagram 200 illustrating various system elements of the exemplary Multi-Function Device 108, in accordance with an embodiment of the present disclosure. The MFD 108 may be a digital printer. As discussed with reference to FIG. 1, the first user 102 and the second users 106 can interact with the MFD 108 directly or indirectly. For example, the first user 102 can execute one or more job requests or commands for execution of the job request remotely from the first computing device 104 to the MFD 108. The MFD 108 can also receive a selection of a dispatch mode from the first computing device 104 or from the first user 102.

As shown, the MFD 108 primarily includes a database 202, a user registration device 204, a detection device 206, a transceiving device 208, a job execution device 210, and a display managing device 212. The MFD 108, in one embodiment, is a computer hardware device with at least one processor (not shown) executing machine readable program instructions of the methods and functions of the embodiments. Such a system may include, in whole or in part, a software application working alone or in conjunction with one or more computer hardware resources. Such software applications may be executed by at least one processor at the MFD 108 computer hardware, or alternatively by multiple processors on different computer hardware platforms or emulated in a virtual environment.

The processor(s) may include, for example, microprocessors, microcomputers, microcontrollers, digital signal processors, central processing units, state machines, logic circuits, and/or any devices and computer memory that manipulate signals based on operational instructions. Among other capabilities, the processor(s) are configured to fetch and execute computer readable instructions.

Further, the MFD 108 may include one or more user interface(s) 112 (for example, a GUI 112). The interface(s) 112 may include a variety of software interfaces, for example, application programming interface, hardware interfaces, for example, cable connectors, or both. As discussed with reference to FIG. 1, the interface(s) 112 may facilitate receiving a selection of a "Yes option," a "No option", and other inputs from the second user 106 or the first user 102. The interface(s) 112 may further facilitate reliably delivering the printed documents post execution of the job request on the MFD 108. Further, one or more devices 202-212 may function in association with the processor(s) for executing one or more instructions.

The first user 102 can provide identity information to the MFD 108 for registration of the second users 106. The transceiving device 208 is configured to receive the identity information from the first user 102 entered by typing at the user interface 112. In some embodiments, the detection device 206 is configured to detect the identity information of the second computing devices 114 when the second computing devices 114 are moved within a pre-defined range of distance from the MFD 108. After identification of second computing devices 114, detection device 206 registers the second users 106 and their associated second computing devices 114. In some embodiments, the first user 102 manually enters the identity information of the second computing devices 114 and the identity information of the second users 106A-106N at the user interface 112. In alternative embodiments, the second users 106 may be registered by performing registration process or entering details on the network 110 or on the network devices (e.g., first computing device 104) without the need to approach or enter data on the MFD 108. The identity information may be provided by the first user 102 during at least one of the time of configuration of the MFD 108 or at a particular time interval. In an exemplary scenario, the first user 102 can define a list of the second users 106A-106N whom the first user 102 feels can collect first user's documents on behalf of him/her and enter the second users' 106A-106N identification information into the user registration device 204. In some embodiments, the second user 106 can be a team member, business unit member, or associate of the first user 102. The transceiving device 208 can receive the identity information of the second users 106 and/or the second computing devices 114A. The identity information of each of the second computing devices 114 can include a Media Access Control (MAC) address, a Radio Frequency Identification (RFID) tag, Bluetooth Identification, and so forth.

The database 202 can store the identity information of the second users 106, second computing devices 114, first computing device 104, and the first user 102. The database 202 may also store the information about various job requests and about network devices present in the network 110. The user registration device 204 is configured to register the second users 106 with the MFD 108 based on the identity information and/or list of the second users 106 provided by the first user 102. The first user 102 can send one or more job requests such as a print job to the MFD 108 and can also select the dispatch mode so that the second users 106 can collect the printed documents on behalf of the first user 102. Post receiving the selection of the dispatch mode along with the job request, the detection device 206 can detect the one or more of the second users 106 present within a pre-defined range of distance from the MFD 108. The one or more of the second users 106 are detected based on the identity information stored in the database 202. The dispatch mode selection informs the MFD 108 to detect the one or more of the second users 106 for dispatch of the documents of the first user 102. In an exemplary scenario, the detection mode 206 may detect the second users that are present with in an area of 5 meters with reference to the MFD 108.

The job execution device 210 can be configured to execute the job request. For example, when the job request is a print job, one or more files are printed on a media. The display managing device 212 can display one or more options on user interface 112 of the MFD 108. The options may include such as, but not limited to, "Yes option", "No option", and so forth. At least one second user 106 of the detected one or more second users 106 can select one of the options, for example, the "Yes option" at the MFD 108 and can collect the one or more documents from the MFD 108. If the second user 106 either selects the "No option" or does not selects any of the options, then the detection device 206 continues searching for the second user 106 until at least a second user 106 selects the "Yes option" on the user interface 112.

Further, the detection device 206 may detect and collect the identity information of the second users 106 present within a pre-defined range of distance from the MFD 108. The detection device 206 can include an IR sensor, an RFID detector, or any suitable motion detector for detecting the one or more second users 106. The detection device 206 is also configured to detect and match the detected identity information with stored identity information present in the database. A message asking the second user 106 to collect the documents of the first user 102 may be displayed by the display managing device on the display or user interface 112 of the MFD 108 when the detection device 206 detects one of the second users 106 approaching near the MFD 108. Further, the transceiving device 208 then can send a first message to those second users 106 whose identity information matches with the stored identity information for requesting them to collect the documents of the first user 102 from the MFD 108.

In some embodiments, when the detection device 206 fails to detect the one or more second users 106, then transceiving device 208 can send a message to retrieve documents of user 102 to other user(s) coming near or within a pre-defined area to of the MFD 108. For example, the first message can be "Hi, ABC documents are present at the printer's output tray, can you hand them over to the first user 102". In some embodiments, a "yes" and a "no" option are provided in the first message. Further, the other user(s) may include user(s) that are not registered for collecting the documents of the first user 102 from the MFD 108 but may be registered with the MFD 108 for collecting documents of third user(s). In some embodiments, when the detection device 206 detects some of the second user 106 present within a pre-defined range of distance from the MFD 108 then a voice message may be played at the MFD 108 asking the detected user 106 to collect the documents of the first user 102. The MFD 108 may include one or more speakers for playing the voice message.

The second computing devices 114 are capable of receiving messages from transceiving device 208. Further, the second computing devices 114 are configured to be paired with the MFD 108. The second computing device 114 can identify itself as the recipient with the identity information such as the MAC address of the device. The transceiving device 208 can include a cellular telephone device, cellular modem device, Wi-Fi device, or any suitable telecommunication device configured to receive and send one or more messages to the detected second computing devices, first computing device 104, etc. In some embodiments, the display managing device 212 displays the first message on the user interface 112 of the MFD 108 along with sending the first message to the detected second user 106 (or other users).

When the at least one second user 106 collects the documents from the MFD 108, then the transceiving device 208 sends a second message to the first user 102. The second message may inform the first user 102 that the one or more documents have been collected by at least one of the second users 106. Additionally, in some embodiments, the transceiving device 208 can send the identity information of at least one of the second users 106 who has collected the documents. The first message and the second message can include, but is not limited to, a short messaging service (SMS) message, an electronic mail (e-mail), a multimedia messaging service (MMS) message, a voice message, an audible message, and combination of these. The second message can be an acknowledgement in form of an email or an SMS for the first user 102.

Further, in some embodiments, the documents may include a cover page including the name or identity information of the first user 102 so that it becomes easy for the second user 106 who collects the documents to identify the documents.

Figure 3A:
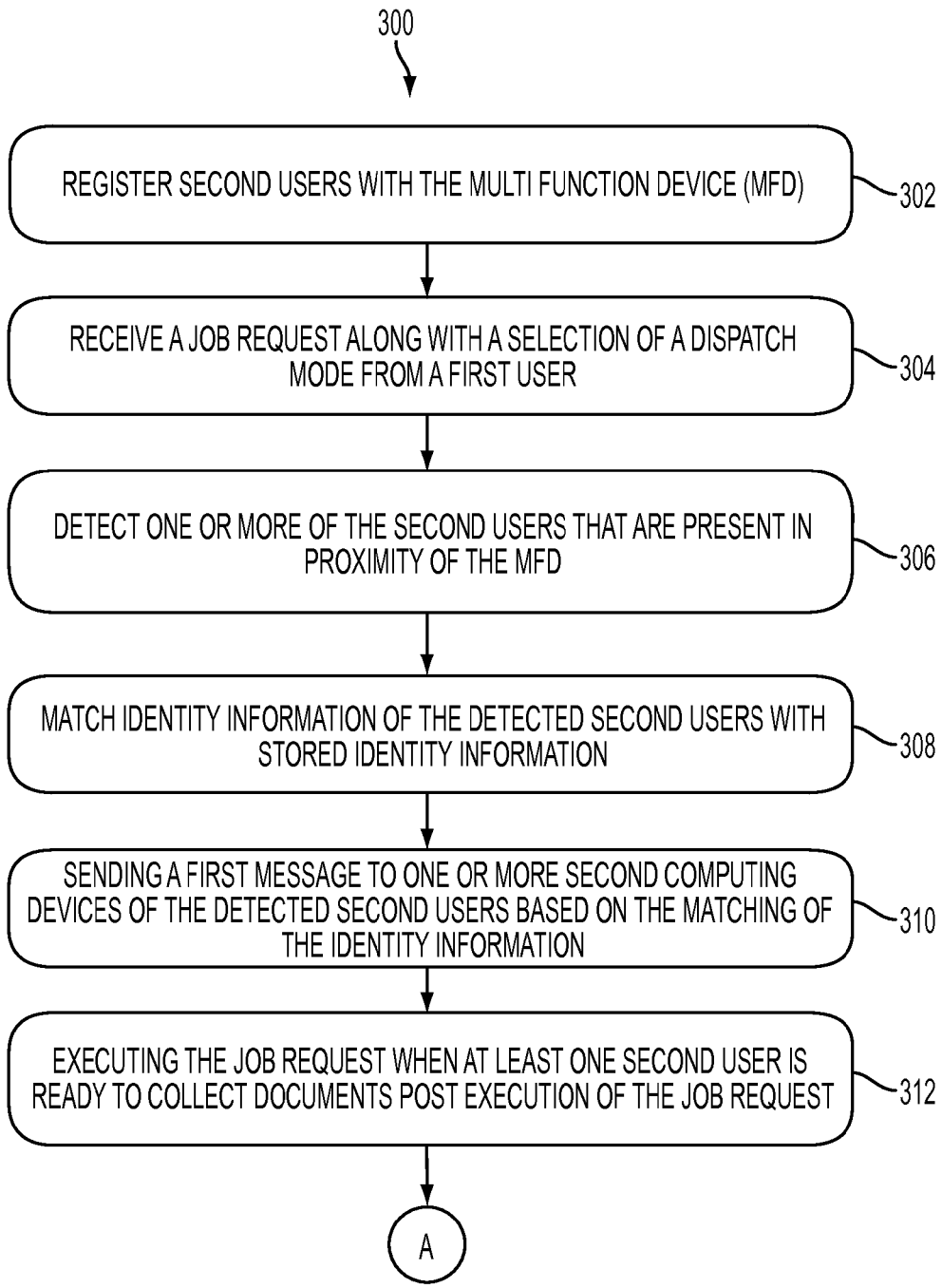
FIGS. 3A-3B is a flowchart illustrating an exemplary method for facilitating a first user to receive his/her document(s) via a second user from the MFD, in accordance with an embodiment of the present disclosure.
Figure 3B:
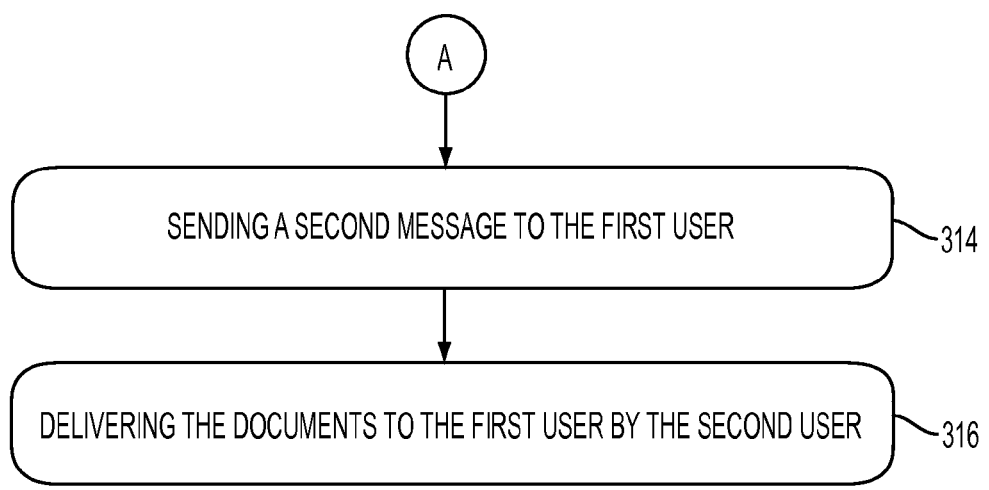

FIGS. 3A-3B is a flowchart illustrating an exemplary method 300 for facilitating a user, such as the first user 102, to receive his/her document(s) via other user(s), such as one of the second users 106, in accordance with an embodiment of the present disclosure. As discussed with reference to FIG. 1, the first user 102 can configure the associated first computing device 104 to send job requests remotely to the MFD 108 via the network 110. The first user 102 can also select a dispatch mode and send this selection along with the job request to indicate to the MFD 108 that the first user 102 wishes his/her documents to be collected by the second users 106 from the MFD 108. The first user 102 can provide identity information of the second users 106 and/or associated second computing devices 114 at the MFD 108 or over network 110.

At step 302, the second users 106 are registered with the MFD 108. In an embodiment, the user registration device 204 registers the second users 106 based on the identity information provided by the first user 102. The first user 102 has to register the second users 106 prior to sending job requests to the MFD 108. In some embodiments, the first user 102 may require to provide MAC addresses of the second computing devices' 114 network adapters. This can be done either manually by bringing the second computing devices 114 near the MFD 108, or by typing the MAC address or the identity information in the interface 112. The database 202 may store the identity information of the second users 106 and may form a directory under the name of the first user 102 to store identity information of the second users 106.

At step 304, a job request, such as a print job request, along with a selection of a dispatch mode is received at the MFD 108 from the first computing device 104 of the first user 102. The MFD 108 can display one or more options, such as "Yes option" and a "No option", on the display of the MFD 108. In some embodiments, the display managing device 212 displays the options on the user interface 112.

At step 306, one or more of the second users 106 who are within a pre-defined range of distance from the MFD 108 are detected. In some embodiments, the detection device 206 detects the presence of the one or more second users 106. Further, the detection device 206 may detect the device based on infrared (IR) sensing, RFI detection, motion detection and so forth. The embodiments are intended to include or otherwise cover any one of multiple techniques for the MFD 108 to detect the user 102 or the second users 106 registered with the MFD 108. For example, techniques can include detection via Wi-Fi detection, Bluetooth detection, and through Near Field Communication (NFC) of the second computing devices 114. The detection device 206 may use the methods described above for detecting the second users 106 that are in proximity to the MFD 108.

The MAC address can be captured or detected by the detection device 206. Then at step 308, captured identity information such as the MAC addresses of the detected second users 106 are matched with stored identity information present in the database 202. If the identity information, i.e., the MAC address, of the one or more second computing devices 114 matches with one of the stored identity information of the second users 106/second computing devices 114, then a first message is sent to the second computing device 114 of the second user 106.

At step 310, the first message is sent to the one or more second computing devices 114 associated with the detected one or more second users 106 requesting the second users 106 to collect documents of the first user 102 from the MFD 108. In some embodiments, the transceiving device 208 sends the first message to the detected second users 106. The second computing devices 114 are capable of receiving messages from the MFD 108. Further, the second computing devices 114 are configured to be paired with the MFD 108. The second computing device 114 can identify itself as the recipient with the identity information such as the MAC address sent along and receives the message. The transceiving device 208 can include a GSM device or any suitable telecommunication device configured to receive and send one or more SMS, MMS, etc., to the detected second computing devices, first computing device 104, etc. In some embodiments, the display managing device 212 displays the first message on the display 112 of the MFD 108 along with sending the first message to the detected second user 106 (or other users).

At step 312, the received job request is executed at the MFD 108 when at least one of the second users 106 is ready or decides to collect the printed or executed documents from the MFD 108. In exemplary scenario, when the print job is executed, one or more files are printed on suitable media such as paper to output one or more documents. One of the detected second users 106 may select one of the options such as the "Yes option" on the user interface 112, to collect the documents of the first user 102. For example, when the second user 106 sees the first message at associated first computing device 104 and is ready for collecting the documents of the first user 102 from the MFD 108, then the second user 106 can go to the MFD 108 and select the "Yes option" on the display 112 of the MFD 108. In alternative embodiments, when the second user 106 does not collects the documents and/or presses the "No option" on the display 112, and then the detection device 206 continues to search for other second users 106 defined or registered with the MFD 108 or other users.

At step 314, a second message is sent to the first user 102 informing that the documents have been collected by the second user 106. In some embodiments, the transceiving device 208 sends the second message to the first user 102. Thereafter, at step 316, the second user 106 who collected the documents from the MFD 108 can deliver the documents to the first user 102.

Though the method 300 is disclosed to be implemented on the MFD 108 but a person skilled in the art will understand that the method 300 can be implemented on a digital printer too.

Figure 4A:
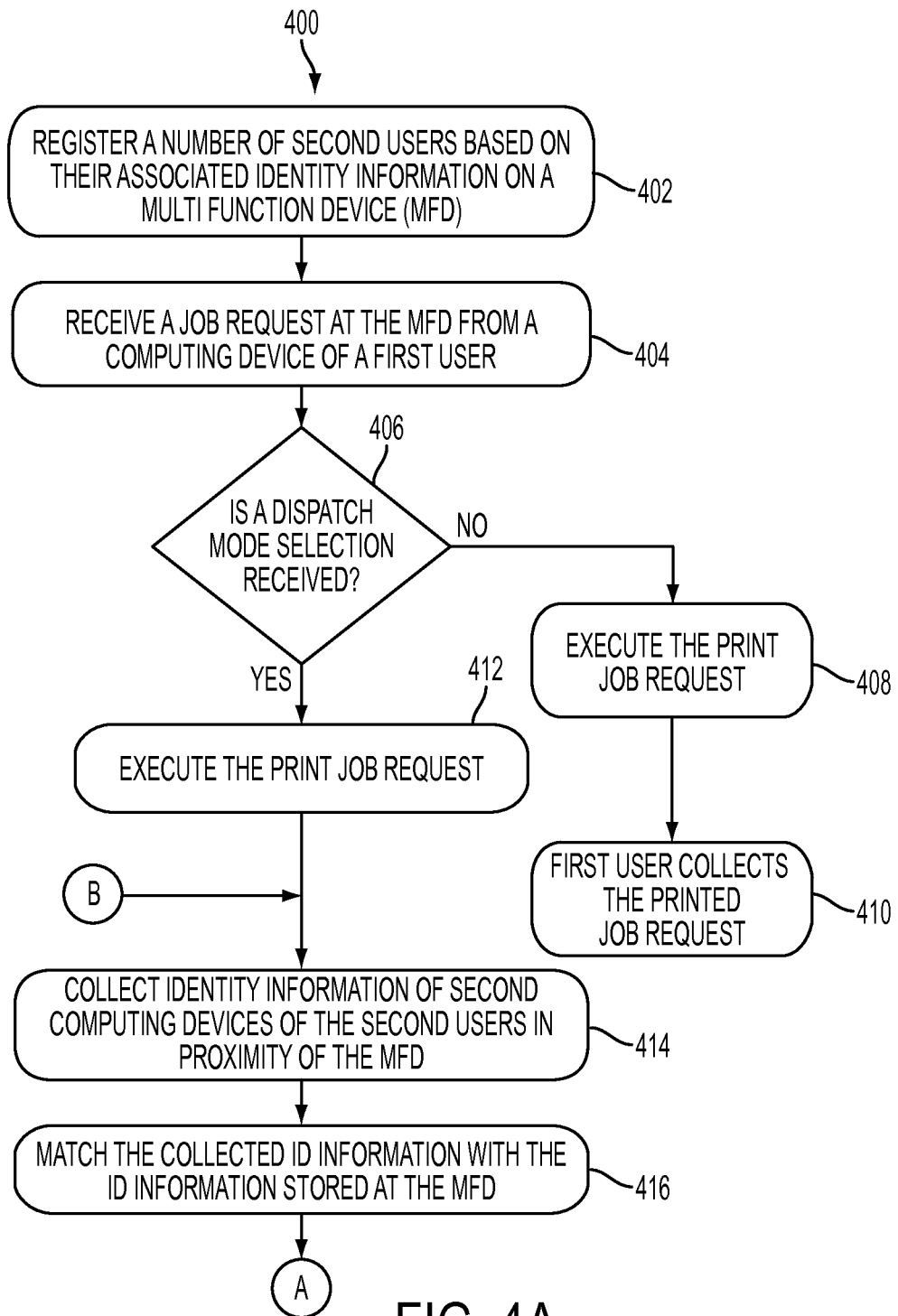
FIGS. 4A-4B is a flowchart illustrating an exemplary method for facilitating a first user to receive his/her printed document(s) via a second user, in accordance with another embodiment of the present disclosure.
Figure 4B:
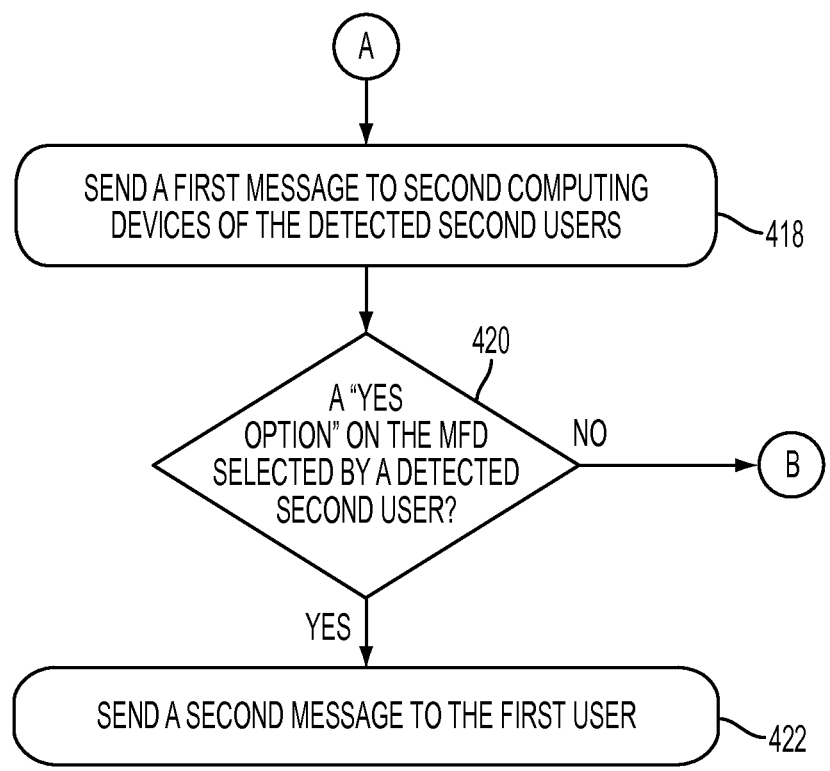

FIGS. 4A-4B is a flowchart illustrating another exemplary method 400 for facilitating a first user to receive his/her document(s) via a second user, in accordance with another embodiment of the present disclosure. Though the method 400 is disclosed to be implemented on the MFD 108 but a person skilled in the art will understand that the method 400 can be implemented on a digital printer too.

At step 402, a number of second users 106 are registered with a printer based on the associated identity information of the second users 106 and/or the second computing devices 114. In some embodiments, the first user 102 provides the identity information of the second users 106 and/or the second computing devices 114 for registration. A user registration device of the MFD 108 may register the second users based on the provided identity information. This may be a one-time process and the registration may happen before receiving a job request and the dispatch mode selection from the first user 102. In some embodiments, the first user 102 may require to provide MAC addresses of the second computing devices' 114 network adapters. This can be done either manually by bringing the second computing devices 114 near the printer (or MFD 108), or by typing the MAC address or the identity information in an interface similar to the interface 112, of the MFD 108. A database may store the identity information of the users and may form a directory under the name of the first user 102 to store identity information of the second users 106.

Then at step 404, a job request is received at the printer from a first computing device of the first user 102. The job request may be received by a transceiving device of the printer. Further, at step 406, a job execution device of the MFD 108 may check whether a dispatch mode selection is received along with the job request by the transceiving device 208. When the dispatch mode selection is not received, then the job execution device 210 executes the job request and output of one or more documents may be generated at step 408. Thereafter, the first user 102 collects the documents from the MFD 108 at step 410.

When the dispatch selection mode is received then at step 412, the job request is executed. Further at step 414, the identity information of one or more second computing devices 114 of the registered second users 106 that are present within a pre-defined range of distance (e.g., within 10 meters) from the MFD 108 is collected. In some embodiments, detection device 206 of the MFD 108 detects and collects the identity information like MAC addresses of the second computing devices 114. The detection may happen using one or more suitable technologies or methods based on NFC, Bluetooth, Wi-Fi, etc. The NFC is a very short range communication, for example, only for few centimeters; hence the second user 106 has to be very much close to the MFD 108 for the second computing device 114 to get detected. On the other hand, Bluetooth and Wi-Fi may work for longer ranges and an antenna used in the printer may be selected based on the range that the printer should be able to recognize. For example, if the MFD 108 needs to recognize only users very close to the printer, then a Wi-Fi receiver may receive only high strength signals. The range of the wireless communication between the second users 106 and the MFD 108 may be set by using the Friis transmission equation described above.

Thereafter, the collected information is matched with stored identity information in the database 202. The detection device 206 matches the identity information with the stored information. Then at step 418, a first message is sent to the second computing devices 114 of the second users 106 based on the matching of the identity information.

At step 420, job execution device 210 determines whether a "Yes option" is selected at the MFD 108 by a detected second user 106 or not. If the selection of the "Yes option" is not received then the control goes back to step 414. Otherwise, step 422 is executed. At step 422, a second message is sent to the first user 102 informing the first user 102 that the documents have been collected by one of the second users 106. In some embodiments, the identity information of the second user 106 who has collected documents for the first user 102 may also be sent to the first user 102.

An aspect of the present disclosure allows the first user 102 to select an option like a dispatch mode while giving a job request for execution to the MFD 108. The dispatch mode selection is required because the first user may not always want his/her documents to be collected by the other users from the MFD 108.

The method disclosed herein allows the first user 102 to make the executed or printed documents come to the first user 102 instead of the first user 102 going to the printer and collecting the documents.

The MFD 108 may include a GSM device or suitable telecommunication network device for enabling exchange of messages, emails, etc. between the MFD and the computing devices present in the network.

It will be understood that the devices and the databases referred to in the previous sections are not necessarily utilized together method or system of the embodiments. Rather, these devices are merely exemplary of the various devices that may be implemented within a MFD (imaging device or printing device), and can be implemented in exemplary another devices, and other devices as appropriate, that can communicate via a network to the exemplary imaging and printing devices.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for facilitating a first user to receive at least one printed document via at least one of a plurality of second users, the method at a digital printer comprising:

registering, by a user registration device of the digital printer, the plurality of second users with the digital printer based on a list of the plurality of second users and associated identity information of the plurality of second users, wherein the identity information is provided by the first user;

detecting, by a detection device of the digital printer, one or more second users of the plurality of second users present within a pre-defined range of distance of the digital printer device when a job request along with a selection of a dispatch mode is received from the first user, wherein the one or more second users are detected based on the identity information stored in a database, wherein the dispatch mode selection informs the digital printer to detect the one or more second users for dispatch of the documents of the first user;

sending, by a transceiving device of the digital printer, a first message to one or more second computing devices associated with the detected one or more second users for requesting the one or more second users to collect one or more documents on behalf of the first user from the digital printer;

executing, by a job execution device of the digital printer, the received job request, wherein at least one second user collects the one or more documents from the digital printer based on the execution of the job request; and sending, by the transceiving device, a second message to the first user, wherein the second message informs the first user that the one or more documents have been collected by the at least one second user.

2. The method of claim 1, wherein registering the plurality of second users comprises receiving the identity information of at least one of the plurality of second users or a plurality of second computing devices, wherein each of the plurality of second computing devices is associated with at least one of the plurality of second users.

3. The method of claim 2, wherein the first user provides the identity information for registering at least one of the plurality of second users and the plurality of second computing devices with the digital printer by at least one of:

bringing the plurality of second computing devices within a pre-defined range of distance of the digital printer such that the detection device detects at least one identity information of the plurality of second computing devices; and manually entering identity information of the plurality of second computing devices and the identity information of the plurality of second users at a display of the digital printer;

wherein the identity information is provided by the first user during at least one of the time of configuration of the digital printer or at a particular time interval.

4. The method of claim 3, wherein the identity information of each of the plurality of second computing devices comprises at least one of a Media Access Control (MAC) address, a Radio Frequency Identification (RFID) tag, and a Bluetooth Identification.

5. The method of claim 4 further comprising:

displaying, by a display manager of the digital printer, one or more options including a yes option and a no option for selection on the display of the digital printer; and executing, by the job execution device, the received job request when the at least one second user of the one or more second users selects the yes option on the display of the digital printer.

6. The method of claim 5, wherein each of the first message and the second message comprises at least one of a short messaging service (SMS) message, an electronic mail (e-mail), an multimedia messaging service (MMS) message, and a voice message.

7. The method of claim 6 further comprising detecting the one or more second users until the at least one of the plurality of second users selects the yes option on the display of the digital printer.

8. The method of claim 7 further comprising storing and maintaining the identity information about at least one of the plurality of second users, the plurality of second computing devices, the first computing device, and the first user in the database.

9. The method of claim 8 further comprising:

detecting and collecting, by the detection device, the identity information of the one or more second computing devices that are within a pre-defined range of distance of the digital printer; and matching, by the detection device, the detected identity information with stored identity information present in the database of the digital printer.

10. A system for facilitating a first user to receive at least one printed document via at least one of a plurality of second users, the system at a digital printer comprising:

a user registration device configured to register the plurality of second users with the digital printer based on a list of the plurality of second users and associated identity information of the plurality of second users, wherein the identity information is provided by the first user;

a detection device configured to detect one or more second users of the plurality of second users present within a pre-defined range of distance from the digital printer when a job request along with a selection of a dispatch mode is received from the first user, the one or more second users are detected based on the identity information stored in a database, wherein the dispatch mode selection informs the digital printer to detect the one or more second users for dispatch of the documents of the first user;

a transceiving device configured to:

receive one or more job requests from a first computing device associated with the first user; and send a first message to one or more second computing devices associated with the detected one or more second users for requesting the one or more second users to collect one or more documents of the first user from the digital printer;

a job execution device configured to execute the received job request, wherein at least one second user collects the one or more documents from the digital printer based on the execution of the job request, wherein the transceiving device sends a second message to the first user, the second message informs the first user that the one or more documents have been collected by the at least one second user.

11. The system of claim 10, wherein the transceiving device is further configured to receive the identity information of at least one of the plurality of second users or a plurality of second computing devices, wherein each of the plurality of second computing devices is associated with at least one of the plurality of second users.

12. The system of claim 11, wherein the detection device is further configured to detect at least one identity information of the plurality of second computing devices when the first user brings the plurality of second computing devices within a pre-defined range of distance of the digital printer for registration of the plurality of second users and their associated second computing devices.

13. The system of claim 12, wherein the first user manually enters the identity information of the plurality of second computing devices and the identity information of the plurality of second users at a user interface of the digital printer, wherein the identity information is provided by the first user during at least one of the time of configuration of the digital printer or at a particular time interval.

14. The system of claim 13, wherein the identity information of each of the plurality of second computing devices comprises at least one of a Media Access Control (MAC) address, a Radio Frequency Identification (RFID) tag, and a Bluetooth Identification.

15. The system of claim 14 further comprising a display manager configured to display one or more options comprising a yes option and a no option for selection on the display of the digital printer.

16. The system of claim 15, wherein the job execution device is further configured to execute the received job request when the at least one second user of the one or more second users selects the yes option on the display of the digital printer.

17. The system of claim 16, wherein the detection device is configured to detect the one or more second users until the at least one of the plurality of second users selects the yes option on the display of the digital printer.

18. The system of claim 17 further comprising the database configured to store and maintain the identity information about the plurality of second users, a plurality of computing devices, and the first user.

19. The system of claim 18, wherein the detection device is further configured to:
   detect and collect the identity information of the one or more second computing devices that are present within a pre-defined range of distance of the digital printer; and
   match the detected identity information with stored identity information present in the database.

20. The system of claim 19, wherein the second message further comprises identity information of the at least one second user who collects the one or more documents on behalf of the first user from the digital printer.

21. A method for facilitating a first user to receive at least one printed document via at least one of a plurality of second users, the method at a Multi-Function Device (MFD) comprising:
   registering, by a user registration device of the MFD, the plurality of second users with the MFD based on a list of the plurality of second users and associated identity information of the plurality of second users, wherein the identity information is provided by the first user;
   detecting, by a detection device of the MFD, one or more second users of the plurality of second users present within a pre-defined range of distance from the MFD when a job request along with a selection of a dispatch mode is received from the first user, wherein the one or more second users are detected based on the identity information stored in a database, wherein the dispatch mode selection informs the MFD to detect the one or more second users for dispatch of the documents of the first user;
   sending, by a transceiving device of the MFD, a first message to one or more second computing devices associated with the detected one or more second users for requesting the one or more second users to collect one or more documents on behalf of the first user from the MFD;
   executing, by a job execution device of the MFD, the received job request, wherein at least one second user collects the one or more documents from the MFD based on the execution of the job request; and
   sending, by the transceiving device, a second message to the first user, wherein the second message informs the first user that the one or more documents have been collected by the at least one second user.

22. The method of claim 21, wherein the MFD is a printing device and the job request comprises a print job request for printing at least one of a file and one or more pages on a media.

* * * * *